(12) United States Patent
Akashi et al.

(10) Patent No.: US 6,267,640 B1
(45) Date of Patent: Jul. 31, 2001

(54) JOINT STRUCTURE FOR SHOULDER OF SYNTHETIC-RESIN-MADE DOLL

(75) Inventors: Tatsuhiko Akashi; Toshiaki Okubo, both of Tokyo (JP)

(73) Assignees: Medicom Toy Corporation; Time House Corporation, both of Tokyo (JP)

( * ) Notice: Subject to any disclaimer, the term of this patent is extended or adjusted under 35 U.S.C. 154(b) by 0 days.

(21) Appl. No.: 09/454,588

(22) Filed: Dec. 7, 1999

(30) Foreign Application Priority Data

Dec. 7, 1998 (JP) .................................................. 10-347091

(51) Int. Cl.⁷ ...................................................... A63H 3/46
(52) U.S. Cl. ............................................................ 446/376
(58) Field of Search .................................... 446/373, 375, 446/376, 378, 379, 382, 371, 97, 99, 102, 104, 383; 403/53, 63, 116, 117, 157, 165

(56) References Cited

U.S. PATENT DOCUMENTS 3,552,786 * 1/1971 Schmid .................................. 403/53
4,623,318 * 11/1986 Tsiknopoulos et al. ............. 446/383
4,642,123 * 2/1987 Noiles ..................................... 403/53
5,257,873 * 11/1993 Abbat ..................................... 403/53

* cited by examiner

*Primary Examiner*—Jacob K. Ackun, Jr.
*Assistant Examiner*—Urszula M. Cegielnik
(74) *Attorney, Agent, or Firm*—Ronald E. Greigg; Edwin E. Greigg (57) ABSTRACT

A joint structure for shoulders of a doll made of synthetic resin includes a first joint segment provided at an upper arm portion of an arm member; a control segment, supported pivotably by the first joint segment, controlling a range of rotation of the first joint segment, a second joint segment provided integrally with the control segment, rotating in a vertical direction when the arm member is further lifted upwards from the point in which a protruded segment of the first joint segment engages with a stopper portion of the control segment; and a third joint segment supported pivotably by the second joint segment, being supported pivotably by a breast portion of a body so that it can rotate together with said second joint segment in a horizontal direction, so that movement of a shoulder can be related closely to movement of human shoulder (natural and real movement) still more.

2 Claims, 8 Drawing Sheets

JOINT STRUCTURE FOR SHOULDER OF SYNTHETIC-RESIN-MADE DOLL

BACKGROUND OF THE INVENTION

The present invention is related to a joint structure for shoulders of a doll, made of synthetic resin, and the like.

One example of a conventional joint structure for shoulders of dolls has disclosed on Japanese Patent Publication No. Sho 57-37353. Concerning the Joint structure disclosed in the embodiment of this official report, one piece of the shoulder members has supported pivotably within a notch portion of an upper body through an axle. An upper arm portion having a spherical shape is engaged rotatably at a curved cam surface defining a cup-shaped portion formed on the shoulder member through the shoulder-connection member.

Concerning the above-mentioned structure, when the arm member is lifted up, the shoulder member has the advantage that is rotated through the shoulder-connection member. Therefore, in a sense, the above-mentioned joint structure can appear like movement of a human shoulder again.

However, since there is not the member controls movement of the shoulder member, the shoulder member moves freely with arm member too much if the arm member is lifted up through the joint structure for this shoulder member. Moreover, since the shoulder member does not rotate in the horizontal axis, the arm member is not made to incline (rotate) in a forward direction. Therefore, there is further improving room with regard to the joint structure of the shoulder member.

SUMMARY OF THE INVENTION

In view of the forgoing, it is an object of the present invention to provide a joint structure for shoulders of a doll made of synthetic resin in which a shoulder assembly (a plurality of shoulder joint members) is made to move gradually, and movement of a shoulder can be related closely to a movement of human movement (natural and real movement) still more when the arm member is lifted upwards. It is another object of the present invention to provide a joint structure for the shoulders of the doll made of synthetic resin that the shoulder assembly (a plurality of shoulder joint members) can be moved so as to slant in a forward direction corresponding to movement of the arm member. It is still another object of the present invention to provide a joint structure for the shoulders of the doll made of synthetic resin that a joint member of the shoulders can be assembled simply each other.

BRIEF DESCRIPTION OF THE DRAWINGS

Each of FIGS. 1 to 8 illustrates an explanatory view of an example of an embodiment of the present invention.

DESCRIPTION OF THE PREFERRED EMBODIMENT

Preferred embodiments of the present invention are described in more detail below in the case of a doll made of synthetic resin.

Numeral 1 shows a doll made of synthetic resin. Numeral 2 shows a body of the doll made of synthetic resin. Numeral 3 shows a breast of a body 2. Numeral 4 shows notch portions, formed in a shape of a frame slightly, which are respectively provided at right and left portions of the breast 3 each. This notch portion 4 includes a horizontal receiving surface 4a and a vertical inner wall surface 4b which crosses to the horizontal receiving surface 4a. Based on FIGS. 7 and 8, the notch portion 4 is formed an angular C letter shape in some degree. M axle hole 5 is provided in a central portion on the horizontal receiving surface 4a in a vertical axis. Concerning this embodiment of the present invention, each joint structure for right and left shoulders includes an identical structural member. Therefore, the joint structure for the left shoulder is now explained as a matter of convenience referring to FIGS. 2 to 6. In this case, same member of each joint structure for the right and left shoulders is denoted by same numeral respectively Numeral 6 shows an arm member with a top end surface 7a of an upper arm member 7 of the arm member 6 being formed an installation hole 8.

Numeral 10 shows a first joint segment provided in operative relation to the upper arm member 7 pivotably about a rotational axis. The first joint segment 10 is composed of belly portion 11 having a balloon form and a projected axle 12. The projected aide 12 projects from a bottom surface of the belly portion 11, the projected axle 12 being inserted to the installation hole 8.

A horizontal groove 13 formed in a shape if a hoof is formed with a central portion of the belly portion 11 in a perpendicular direction. A protruded segment 14 projects from the central portion of an inner bottom surface of the horizontal groove 13. A horizontal through hole 15 is penetrated so as to cross the horizontal groove 13 on the belly portion 11. A pivot pin 16 is inserted into the horizontal hole 15.

Numeral 20 shows a control segment. This control segment 20 is supported pivotably on the first joint segment 10 through the pivot pin 16 and controls a range of rotation of the first joint segment 10. The control segment 20 is fixed at free fixed state within the horizontal groove 13 of the belly portion 11 and is further composed of a stopper 21 formed in a shape of a board and an insertion 22. The stopper 21 is supported pivotably by the pivot pin 16. The insertion axle 22 projects in a radial direction from a central portion of an outside circumferential wall defining a semicircular arcuate surface of the stopper 21.

An outside circumferential portion of lower portion at the stopper 21 is cut away a portion thereof so as to form in a shape of an arc. As a result, the stopper 21 includes right and left stopper portions 21a and 21b (the engaged surfaces) at a lower portion thereof. A central hole 23, which the pivot pin 16 penetrates, is formed with the stopper 21.

Numeral 25 shows a second joint segment which is provided integrally with the control segment 20 as an assembly. The second joint segment 25 rotates in a vertical direction when the arm member 6 is further lifted upwards from the point in which the protruded segment 14 of the first joint segment 10 fixes to the left stopper portion 21a of the control segment 20. Moreover, the second joint segment 25 is formed at an expanded state substantially so as to be reminded an imagery of muscle excepting a vertical surface 26 having a circular shape and an inner wall surface 27 having a mortar-like shape of lower portion at the second joint segment 25.

Figure 4:
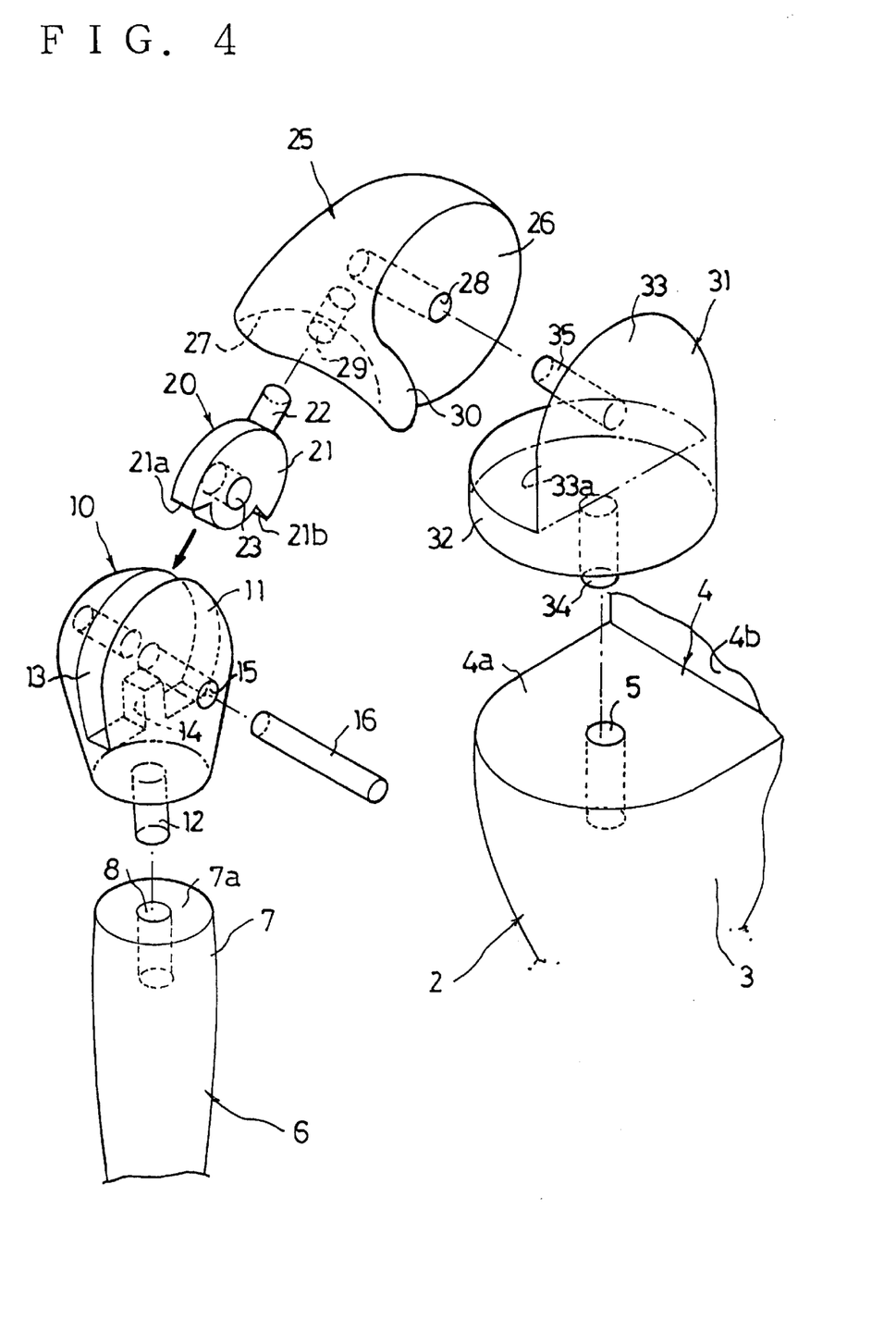
FIG. 4 is an exploded explanatory view.

An axle hole 28 is provided at the central portion of the vertical surface 26 in a horizontal axis. A hole 29 is provided at a central portion of the inner wall surface 27. In addition, as shown in FIG. 4, a skirt portion 30, including a protrusion, formed on the inner wall surface 27 of the second joint segment 25 is provided so as to protrude toward and over the vertical surface 26. The protrusion of the skirt portion 30 is associated and in contact close with a third joint segment will be described later.

Finally, numeral 31 shows the third joint segment The third joint segment 31 is supported pivotably by the second joint segment 25 and supported pivotably by the breast portion 3 of the body 2, so that it can swivel together with the second joint segment 25 in a horizontal direction. The third joint segment 31 is composed of a base 32 and a vertical wall portion 33. The base 32 is formed in a shape of a disc and provided pivotably at the horizontal receptible surface 4a of the body 2. The vertical wall portion 33 extends from one of the sidewalls upwards.

A vertical axle 34 protrudes from a central portion of a bottom surface of the base 32 and is inserted into the hole 5 of the breast portion 3. On the other hand, a horizontal shaft 35 protrudes from the inner vertical wall surface 33a of the vertical wall portion 33 and is inserted into the axle hole 28 in a direction that makes the horizontal axle 35 perpendicular to the vertical axle 34.

Figure 1:
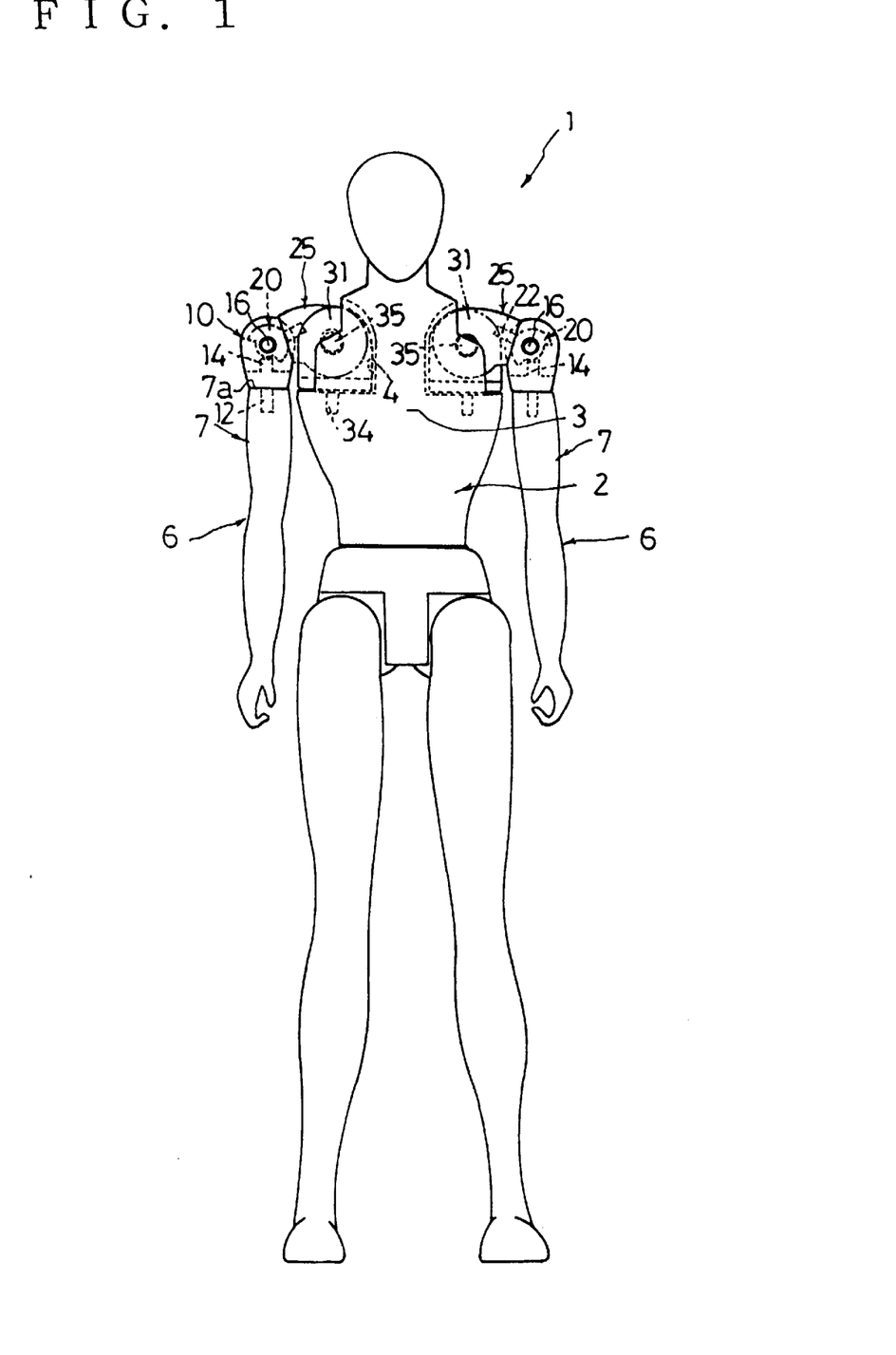
FIG. 1 is a schematic explanatory view of a doll showing an embodiment of the present invention.
Figure 2:
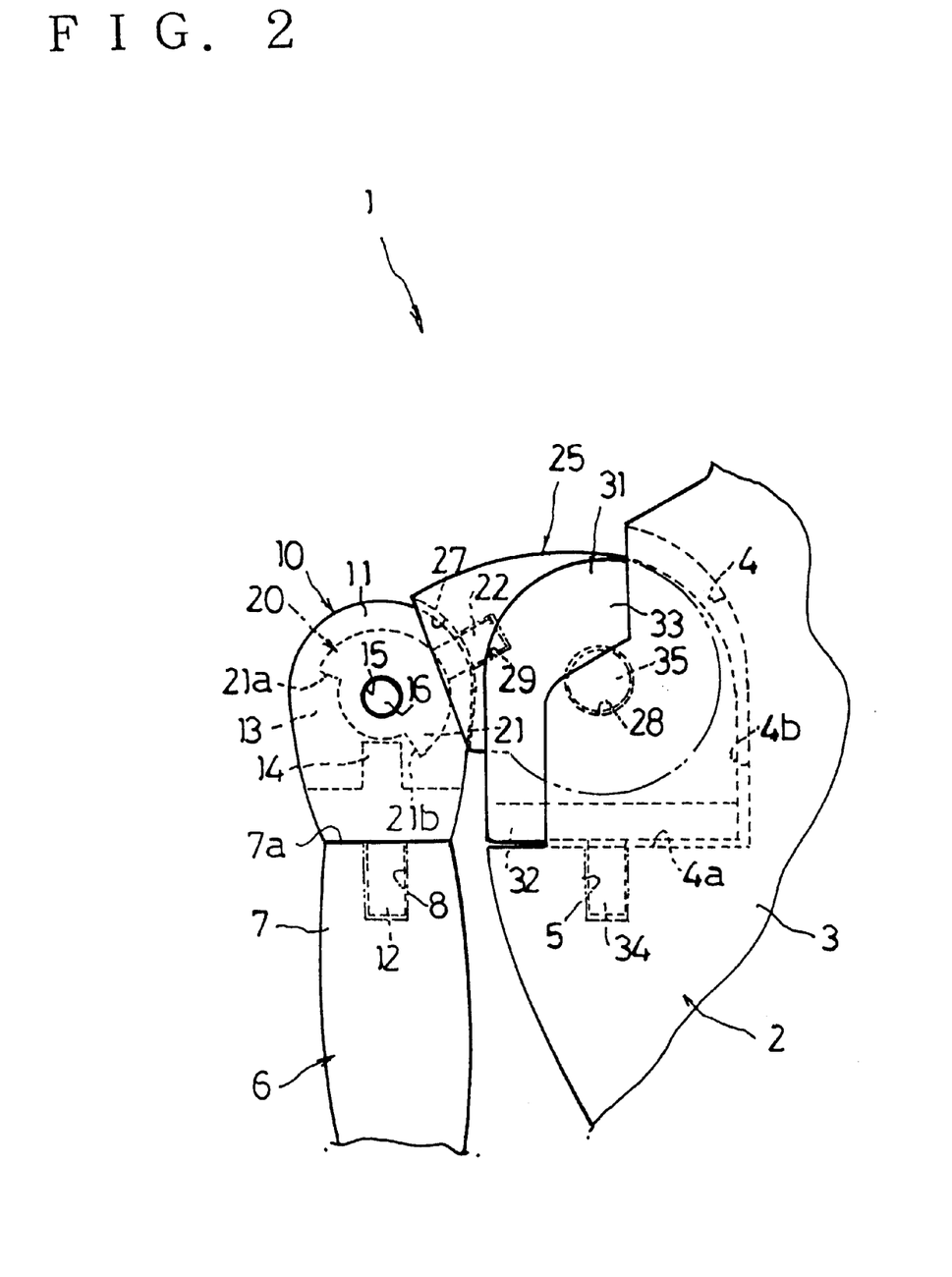
FIG. 2 is a front view.
Figure 3:
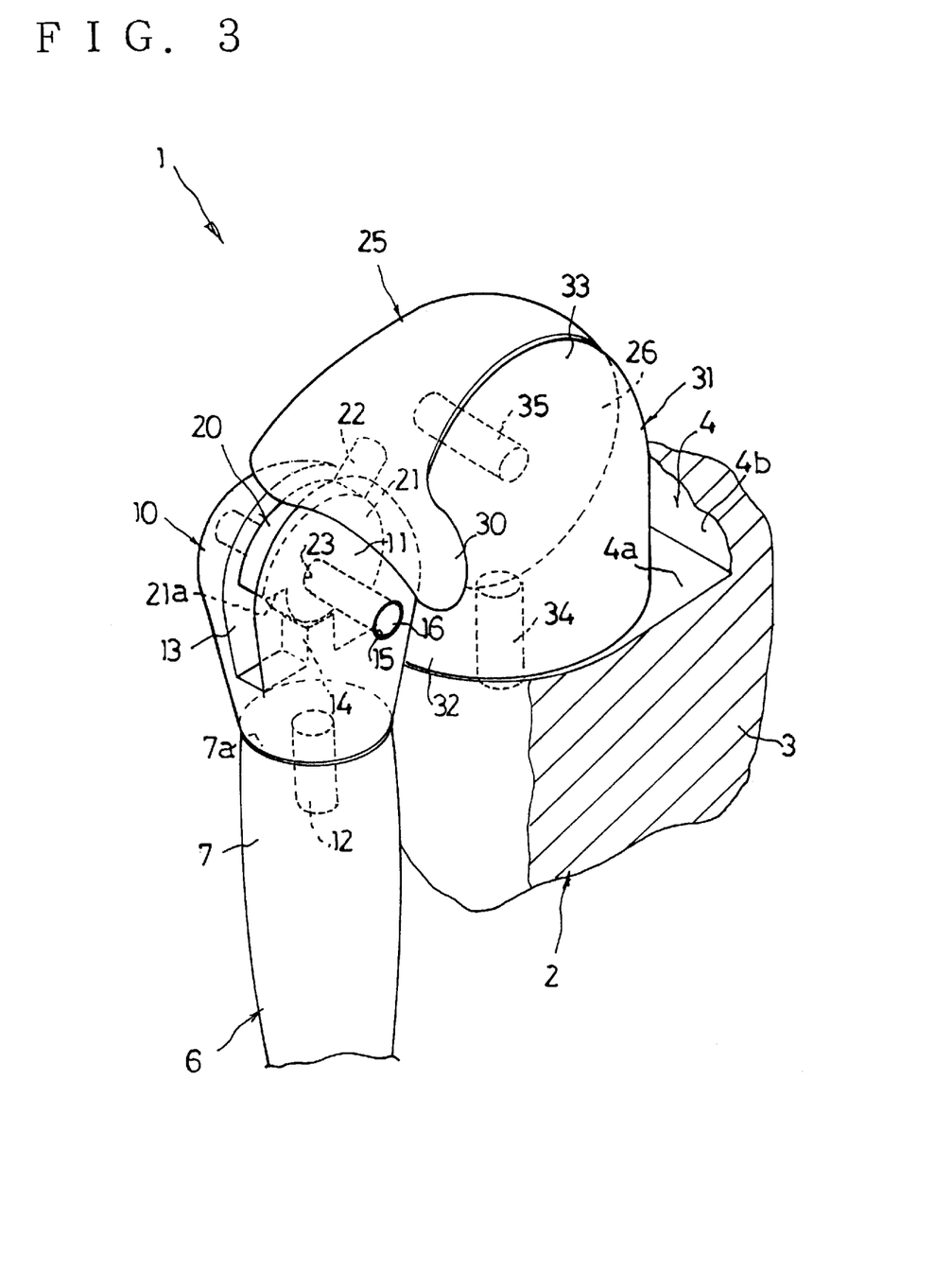
FIG. 3 is a schematic perspective view.

Concerning the above-mentioned joint structure for the shoulders of the doll made of synthetic resin, based on the characteristics already mention, FIG. 1 shows that the joint structure maintains the right and left members 6 and 6 in the normal position. The first joint segment 10 turns toward the lower direction substantially. Concerning the 2nd joint segment 25, the inner wall surface 27 of the second joint segment 25 tiles slantwise in some degree toward the lower direction.

Figure 5:
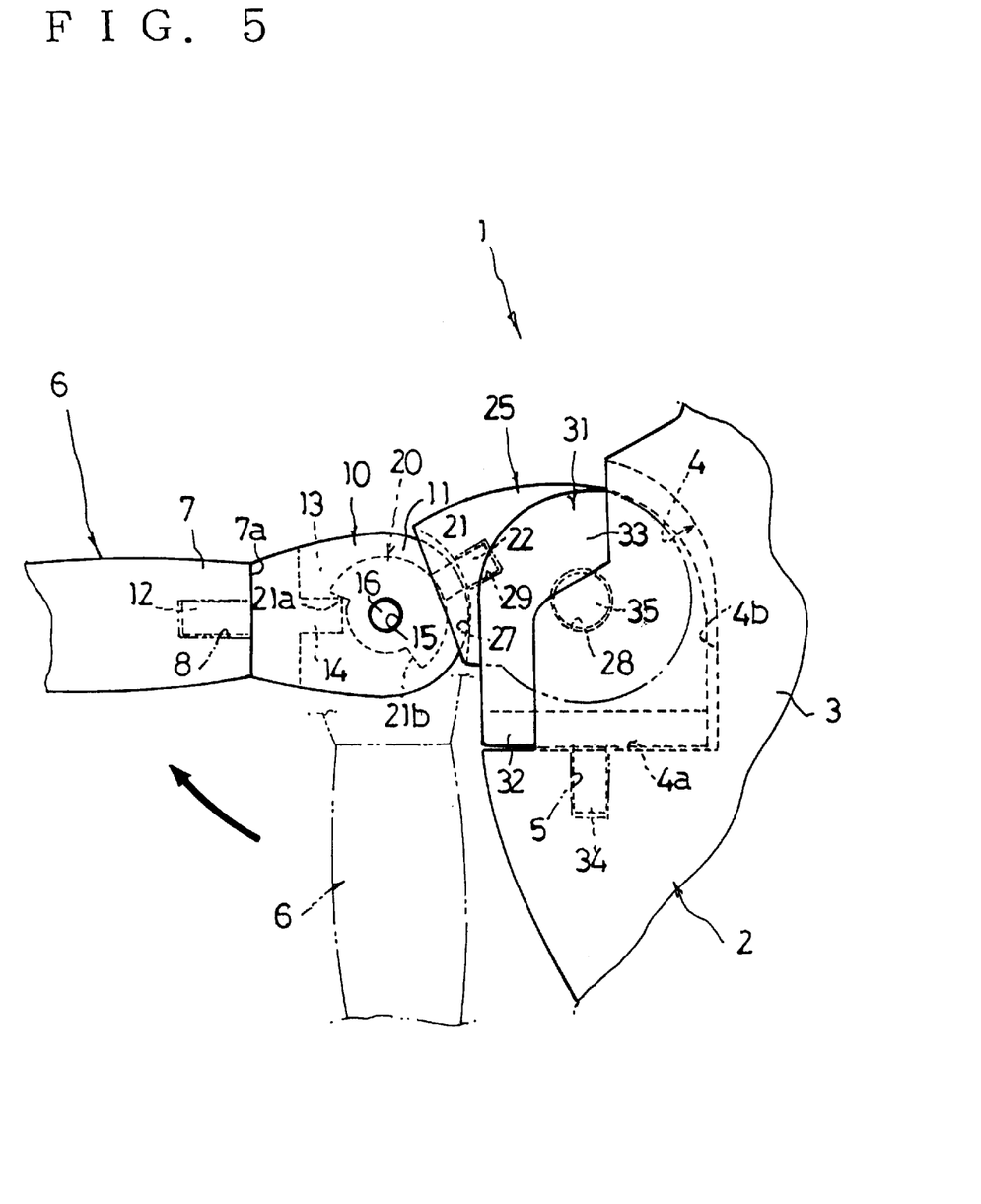
FIG. 5 is an explanatory view showing the way in which a left arm member is lifted up at a horizontal state.

For example, when left arm member 6 is lifted up toward an arrow as shown in FIG. 5, the left arm member 6 swivels through the first joint segment 10 clockwise. Afterward, when the left arm member 6 positions so as to approach at a horizontal state nearly, the projection 14 of the first joint segment 10 hits the stopper portion 21a of the control segment 20. Until then, since the first joint segment 10 (a combined portion composed of the horizontal hole 15, central hole 23 and pivot pin 16 in this case) adjusts a gap between the a)de holes 15, 23 and the pivot pin 16 such that the sliding resistance decreases to an axle portion of the second joint segment (a combined portion composed of the axle hole 28 and horizontal shaft in this case), the second joint segment 25 does not move at all.

When the left arm member 6 is lifted upwards from a position whose it locates at a horizontal state as shown in an arrow, the second joint segment 25 rotates centering the horizontal a)de 35 of the third joint segment 31 through the control segment 20.

Figure 6:
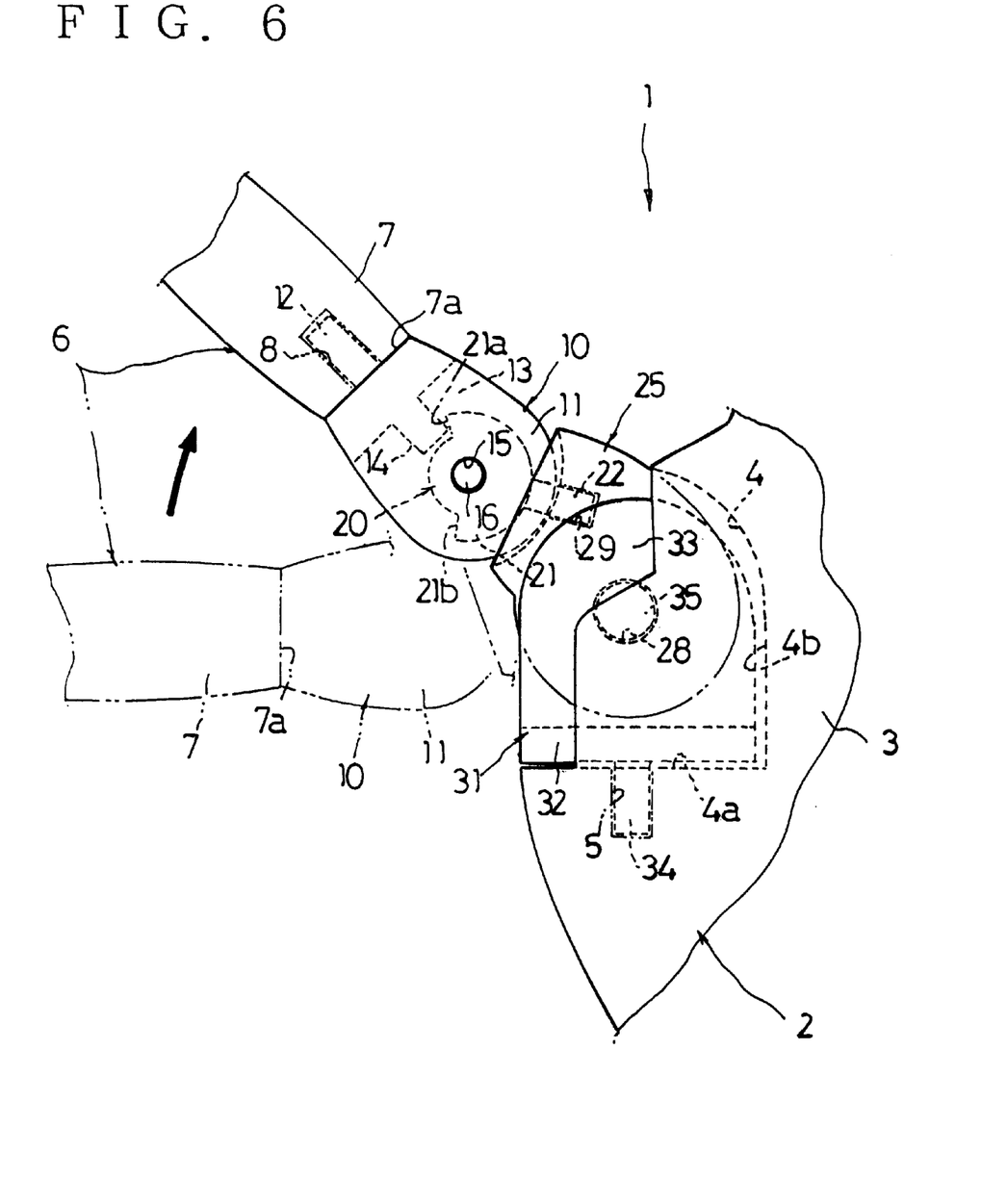
FIG. 6 is an explanatory view showing the way in which a left arm member, shown in FIG. 5, is further lifted upwards.

Therefore, when the shoulder assembly lifts the arm member 6 up to a state as shown in FIG. 6 from a state shown in FIG. 1, it moves gradually like movement of a human shoulder.

Figure 7:
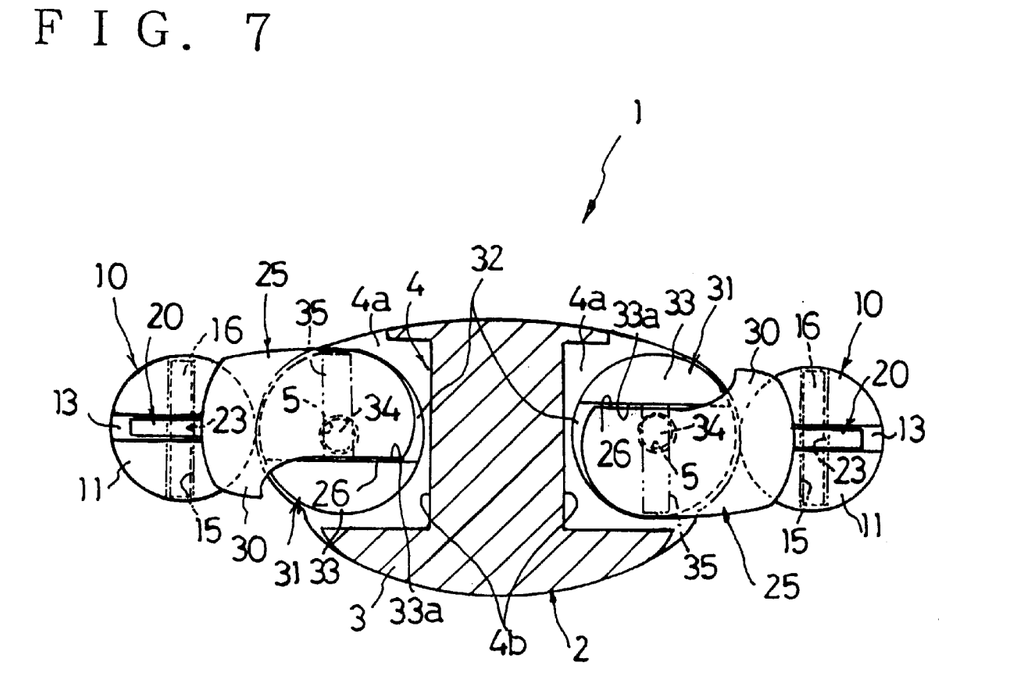
FIG. 7 is a schematic cross-sectional view.
Figure 8:
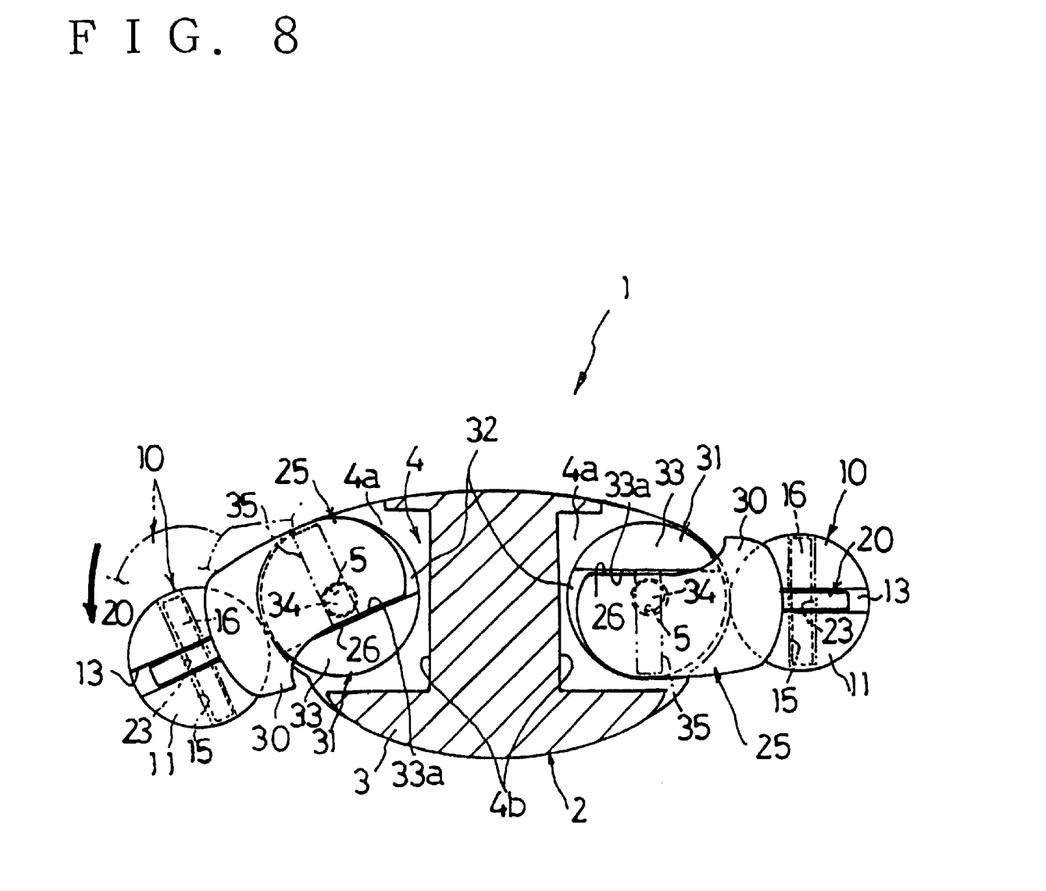
FIG. 8 is an explanatory view showing the way in which a left arm member, shown in FIG. 7, is moved so as to slant in a forward direction.

As shown in FIG. 8, when the arm member 6 is moved so as to slant in a forward direction from a position whose it locates at an usual condition shown in FIG. 7, the shoulder assembly 10, 25 and 31 (a plurality of shoulder joint members) journals the verticle axle 34 of the third joint segment 31 in a fulcrum because the vertical surface 26 of the second joint segment 25 is arranged in close contact with the vertical inner wall surface 33a of the third joint segment 31.

Therefore, in order that the shoulder assembly (a plurality of shoulder joint members) moves so as to slant in the forward direction corresponding to the movement of the arm member 6.

The control segment 20 may be formed integrally with the second joint segment 25. Moreover, it is possible to change properly a design of engaging relation of a projection of the joint member and control segment A change of design of relation of an axle hole and an axle is property possible.

As set forth above, the advantages of the invention are as follows:

(1) When the arm member is lifted upwards, the shoulder assembly is made to rotate gradually and movement of a shoulder can be related closely to a movement of human movement (natural and real movement) still more.

(2) A shoulder assembly can be moved so as to slant in a forward direction corresponding to movement of the arm member.

(3) The joint members of a shoulder can be assembled simply each other.

What is claimed is:

1. A joint structure for shoulder movement of a doll made of synthetic resin comprising;

a first joint segment (10) secured to an upper arm portion (7) of an arm member (6) by a projecting pin (12) extending from a curved portion (11);

a control segment (20) supported pivotably by a pivot pin by said first joint segment, said control segment including an arcuate shaped portion included stop shoulders (21a, 21b), said stop shoulders controlling a range of rotation of said first joint segment;

a second joint segment (25) articulated by a pivot pin integrally formed, with said control segment (20), said second joint segment (25) being rotatable in a vertical direction when said arm member (6) is further lifted upwards from a point in which a protruded segment (14) of said first joint segment engages one of said stop shoulders of said control segment; and a third joint segment (31) which is supported pivotably by said second joint segment, said third joint segment being supported pivotably by a breast portion (3) of a body portion, so that the third joint segment can rotate together with said second joint segment in a horizontal direction.

2. A joint structure for shoulder movement of a doll made of synthetic resin according to claim 1, wherein said control segment (20) and second joint segment (25) are integrally formed.

* * * * *